Nov. 15, 1960     J. W. DISTEL     2,960,016
PHOTOGRAPHIC SHUTTER

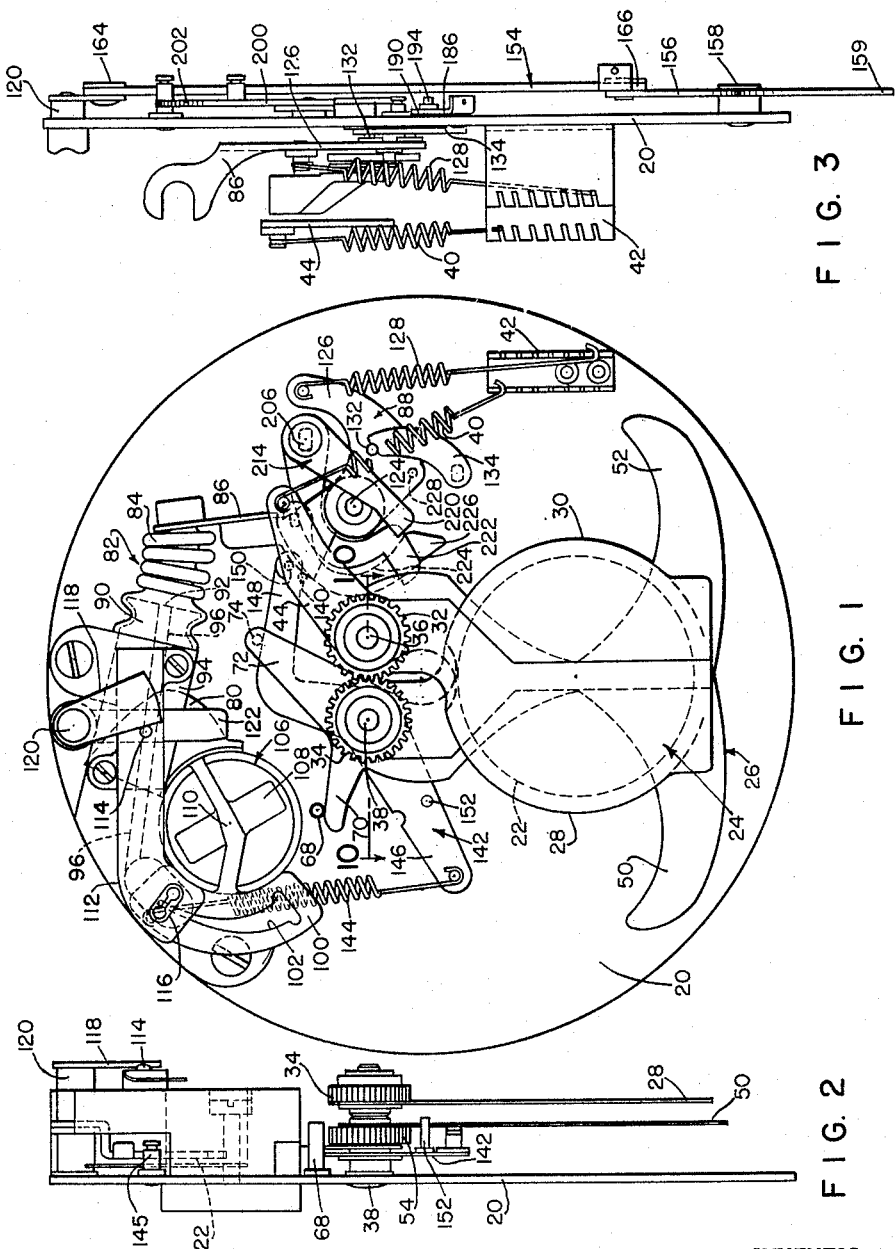

Filed Oct. 22, 1959     5 Sheets-Sheet 2

INVENTOR.
Joseph W. Distel
BY
Brown and Mikulka
and
Robert J. Schiller
ATTORNEYS Nov. 15, 1960 J. W. DISTEL 2,960,016
PHOTOGRAPHIC SHUTTER
Filed Oct. 22, 1959 5 Sheets-Sheet 3

INVENTOR.
Joseph W. Distel
BY Brown and Mikulka
Robert J. Schiller
ATTORNEYS

Nov. 15, 1960  J. W. DISTEL  2,960,016
PHOTOGRAPHIC SHUTTER
Filed Oct. 22, 1959  5 Sheets-Sheet 4

INVENTOR.
Joseph W. Distel
BY Brown and Mikulka
and
Robert J. Schiller
ATTORNEYS United States Patent Office 2,960,016
Patented Nov. 15, 1960

2,960,016

PHOTOGRAPHIC SHUTTER

Joseph W. Distel, Boston, Mass., assignor to Polaroid Corporation, Cambridge, Mass., a corporation of Delaware Filed Oct. 22, 1959, Ser. No. 847,964

21 Claims. (Cl. 95—10)

This invention relates to photography and more particularly to exposure control devices.

Many shutter mechanisms comprise solid shutter blades which effect exposure by movement between a closed position wherein the shutter blades completely occlude an exposure aperture and a fully opened or uncovering position with respect to the aperture. Exposure is initiated by movement of the shutter blades from the closed to the opened position, and terminated by reverse movement of the shutter blades. Many iris shutters, for instance, are of this type. The operation of such a shutter mechanism requires stopping and reversing the direction of movement of the shutter blades; because of the inertia of the blades, these requirements are a source of substantial impairment of the timekeeping accuracy of the shutter mechanism, particularly for the attainment of very short exposure periods such as 1/1000 second. Consequently, a principal object of the invention is to provide a novel shutter mechanism comprising shutter means which function only to initiate exposure, and including diaphragm means for variably defining the magnitude of an exposure aperture, the diaphragm means being operable for terminating said exposure.

Another object of this invention is to provide such a shutter mechanism including regulating means for controlling both the aperture-defining function of the diaphragm means and the time interval between initiation and termination of exposure.

Other objects of the invention are to provide a novel shutter device of the type described wherein both exposure aperture and exposure time interval are determined in accordance with the intensity of illumination of the field of view of the mechanism as determined by photoelectric means, which shutter device is highly accurate, comparatively simple, and compact; and to provide a shutter device of the type described wherein exposure is effected through a sequence of operations wherein a diaphragm means is first moved to a position determined in accordance with the intensity of illumination of the field of view of the shutter, thereby establishing an exposure aperture, then a shutter mechanism is moved to initiate exposure through the exposure aperture, and lastly means are moved for imparting an impulse to the diaphragm so as to move the latter to terminate said exposure, the time interval between initiation and termination of exposure being a function of said intensity of light.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

Figure 1 is a schematic front elevation of most of the assembled components of one embodiment of the invention showing the components in rest position;

Fig. 2 is one side elevation, partly in fragment, of the embodiment of the invention shown in Figure 1;

Fig. 3 is the other side elevation, also partly in fragment, of the embodiment of Figure 1 and Figure 9;

Figure 4:
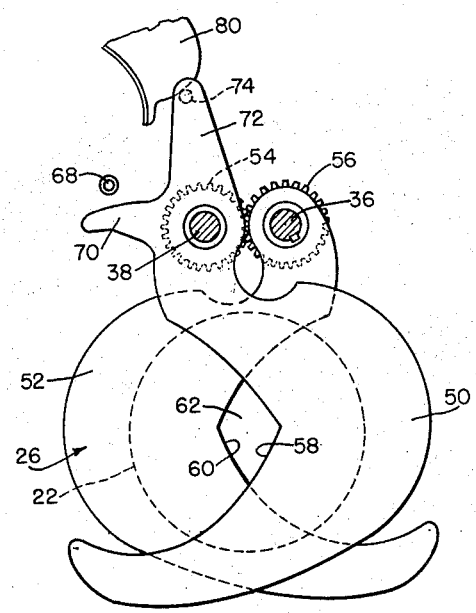
Fig. 4 is a fragmentary schematic view of the diaphragm means of the embodiment of Figure 1 showing the leaves in an aperture-defining position.

The invention is concerned with a shutter-and-diaphragm assembly which includes a diaphragm means for defining an exposure aperture and means for adjusting the diaphragm means to vary the magnitude of the exposure aperture. The invention also comprises shutter means normally disposed in covering relation to the aperture defined by the diphragm means, the shutter means being movable for initiating exposure through the exposure aperture. The invention contemplates inclusion of regulating means for determining the total exposure provided by movement of the shutter means and the diaphragm means in a sequence of operations wherein first the regulating means controls the setting of the diaphragm so as to define an exposure aperture, then controls the opening of the shutter means for allowing passage of actinic radiation through the exposure aperture, and lastly controls the initiation of movement of the diaphragm means from its set or aperture-defining position to an aperture-covering position for terminating exposure. Impulse means are preferably provided for effecting this latter movement of the diaphragm means.

In the embodiment shown, the exposure provided by the regulating means is a function of ambient illumination, and to this end the invention also includes means for translating electrical signals into mechanical displacements, the electrical signals being produced by a photoelectric means in accordance with ambient illumination. The regulating means is constructed and arranged for adjusting the diaphragm means so that the exposure aperture is established in accordance with these displacements and therefore as a function of the intensity of the illumination. The regulating means also includes time-regulating means for controlling the exposure period in accordance with the intensity of the illumination.

Referring now to the drawings, there is shown one embodiment of the invention. Support means for the operative elements of the invention are provided in the form of a backing plate 20 comprising a thin, flat, substantially rigid and circular element. Suitably disposed in plate 20 is an opening 22 of predetermined shape and size and which is adapted for alignment with the optical axis of a lens system when the embodiment is to be employed, for instance, with a camera. Mounted upon one surface of backing plate 20 and normally disposed in fully covering relation to aperture 22 are shutter means, indicated generally by the reference numeral 24 and shown particularly in Figs. 6 and 7, and diaphragm means, indicated generally by the reference numeral 26 and shown particularly in Figs. 4 and 5.

Shutter means 24 preferably comprises a multiple-leaved device, which in the form shown includes at least two thin, substantially planar, opaque blades 28 and 30 which are individually and respectively mounted upon suitable bearing means such as circular gears 32 and 34. Gears 32 and 34 are in turn mounted for rotation about and independently of support members such as posts 36 and 38, respectively, gears 32 and 34 being in meshing engagement with one another. Posts 36 and 38 are mounted upon backing plate 20 adjacent one another and to opening 22 so that both blades are movable respectively in their own planes closely adjacent and approximately parallel to one another between a first or closed position wherein the blades cooperate to fully cover opening 22 to occlude actinic radiation therethrough, and a second or open position wherein both blades completely uncover the opening, thereby allowing the passage of the radiation. Blade 28 is provided with a lever arm 44 which comprises an integral portion thereof and extends in the plane of the blade on an opposite side of post 36 from the aperture-covering portion of the blade. As a means for moving the blades from closed to open position there is included a resilient element such as elongated spring 40 which is attached at one extremity thereof to lever arm 44, as at post 46, the other extremity of spring 40 being attached to an anchoring device 42. The anchoring device preferably comprises an element mounted upon backing plate 20 and having a plurality of adjacent openings therein into which the appropriate extremity of spring 40 may be releasably inserted for engagement, thus providing a simple means for adjusting the tension on spring 40. In the embodiment shown, particularly in Fig. 7, when in uncovering position, the blades are disposed symmetrically about the exposure aperture. This symmetry of the shutter is advantageous in providing a compact form, hence is preferred. However, an alternative embodiment may be constructed wherein the shutter means comprises a single blade movable between fully covering and fully uncovering positions relative to the exposure aperture.

Diaphragm means 26 preferably comprises another multiple-leaved device, which in the form shown includes at least two thin, substantially planar, opaque leaves 50 and 52 which are also mounted upon and for rotation with suitable bearing means such as circular gears 54 and 56, respectively, each of the gears being mounted coaxially with, yet independently of, gears 34 and 32 respectively. Gears 54 and 56 are in meshing relation with one another so that the rotation of one leaf in one direction is accompanied simultaneously and in fixed relation thereto by the rotation of the other leaf in an opposite direction, the blades being movable respectively in their own planes closely adjacent and substantially parallel to one another. Gear 54 is mounted for rotation freely about post 38, but gear 56 is mounted upon post 36 for rotation therewith, preferably by being keyed thereto. Post 36 is so mounted upon backing plate 20 as to extend therethrough from one side of the backing plate to the other and is freely rotatable about its long axis with respect to the backing plate.

As a means for defining an effective exposure aperture in cooperation with opening 22, leaf 50 is provided, in a portion thereof which normally overlies opening 22, with an opening or notch 58 which preferably has a V-shape such as approximately a right angle; leaf 52 is provided with a similar notch 60. As mounted on gears 54 and 56, the leaves are normally movable between a closed position wherein the leaves cooperatively overlap to fully cover opening 22 so as to allow no actinic radiation to pass therethrough, and a plurality of uncovering positions wherein the notches cooperate to delimit a variable opening 62 disposed symmetrically about an axis perpendicular to the center of the plane of opening 22.

Figure 9:
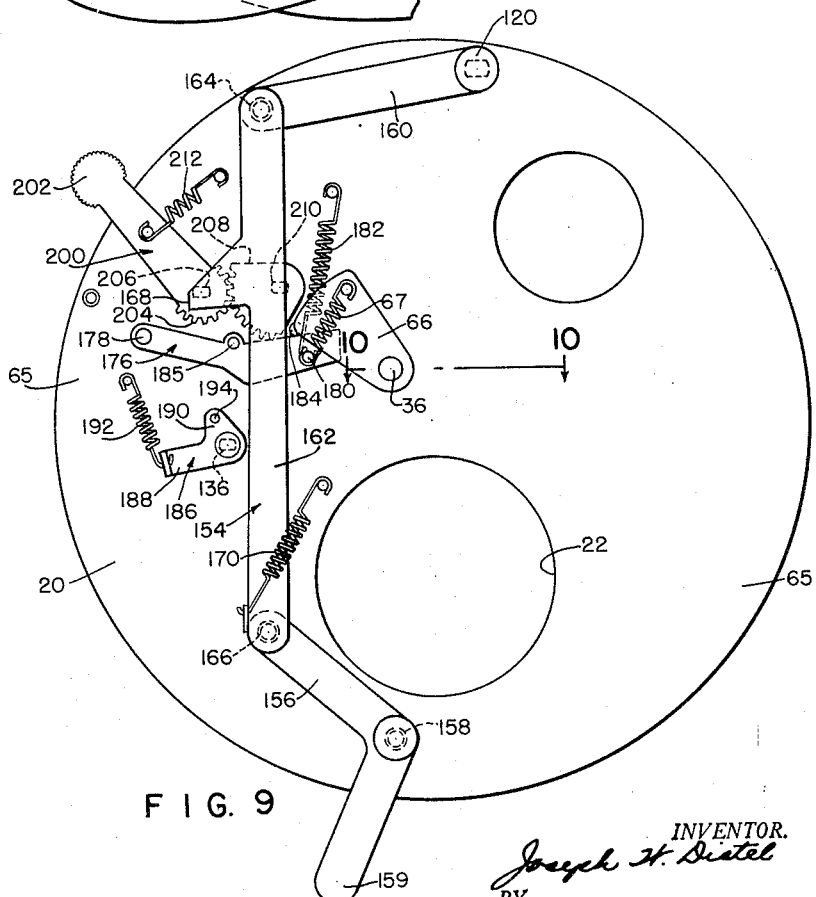
Fig. 9 is a schematic rear elevation of additional components of the embodiment of the invention shown in Figure 1.
Figure 10:
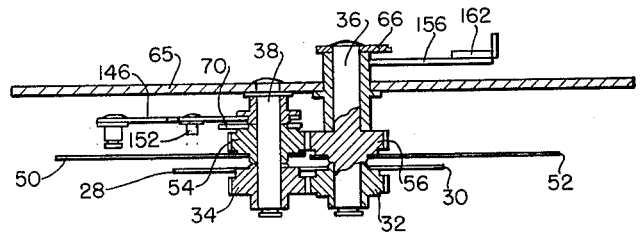
Fig. 10 is a cross section taken along the line 10—10 of Figure 1 and of Figure 9.

As may be seen in Figs. 9 and 10, post 36 extends substantially perpendicularly to backing plate 20 and is joined on the opposite surface 65 of the backing plate from the diaphragm leaves by lever arm 66 which is affixed to post 36 for rotation therewith. Lever arm 66 is movable in a plane substantially perpendicular to the long axis of post 36 and therefore substantially parallel to the planes of movement of the diaphragm leaves. It is apparent that because lever 66, post 36, gear 56 and diaphragm leaf 52 are all affixed to one another for movement together, and as gear 56 is in meshing engagement with gear 54, rotation of lever 66 will cause the diaphragm leaves to move oppositely to one another. Resilient means such as spring 67, one extremity of which is anchored upon lever 66, is provided for biasing the diaphragm leaves for movement about their respective bearing means from fully covering position toward a position wherein the diaphragm leaves define a maximum effective exposure aperture.

As shown in Fig. 4, mounted on backing plate 20 is a means such as stop pin 68 for limiting the rotation of the diaphragm leaves from their maximum uncovering position (at which the largest effective exposure aperture is defined) to a fully covering position, thereby establishing the latter. Leaf 50 is provided with a first extending portion 70 which is formed in the plane of the leaf and extends outwarldy from post 36, being adapted to engage stop pin 68 when the diaphragm leaves have rotated to a position wherein they cooperate in fully covering opening 22. In the embodiment shown, leaf 50 is also provided with a second extending portion 72 which also extends substantially in the plane of the leaf and is set at an angle to first extending portion 70. Mounted on the second extending portion adjacent the extremity thereof is a cam follower such as pin 74 which is adapted to slidably engage a cam element described hereinafter.

Figure 8:
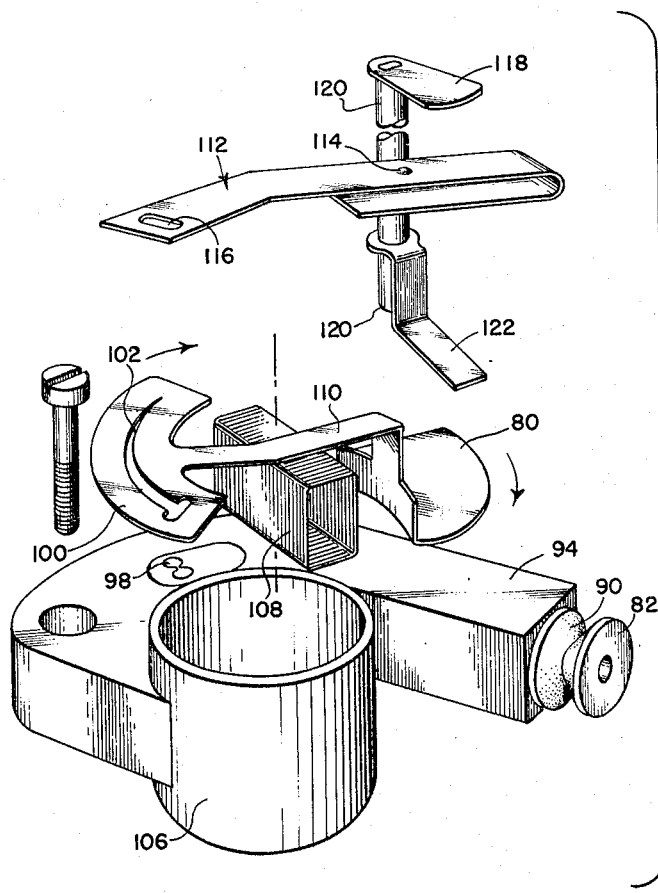
Fig. 8 is an exploded, perspective schematic view of selected elements of a shutter speed and diaphragm control mechanism, partly in fragment, of the embodiment of Figure 1.

Regulating means are provided for controlling total exposure and are shown particularly in Figs. 1 and 8. The regulating means include setting means for controlling the magnitude or area of the effective exposure aperture provided by the cooperation of the notches with opening 22, and time-regulating means for controlling the exposure period. The setting means preferably comprises cam element 80 which is in sliding engagement with pin 74 and so mounted for movement as to provide a variably positionable limit stop for arresting the rotation of the diaphragm leaves when the latter are under the bias imposed by spring 67.

The time-regulating means, in the form shown, comprises a deformable pneumatic device such as substantially elastic, hollow bellows 82. The bellows is preferably formed with a first or movable extremity 84 which is connected directly to the extremity of arm 86 of timing element 88 and is movable therewith. Bellows 82 is also provided with a second or fixed extremity 90 having an opening 92 therein through which a fluid or gas may flow in and out of the interior of the bellows. As a means for providing an anchor for the fixed extremity of the bellows and for providing a passageway to a fluid-flow controlling means, the embodiment shown includes a valve block 94 having a tubular passageway 96 therein, the valve block being mounted by suitable means upon plate 20. One end of passageway 96 is joined to opening 92 in the bellows, preferably by a leakproof junction, the other end of passageway 96 terminating at a surface of valve block 94 to provide an opening or valve aperture 98.

For controlling the rate of movement of a fluid or gas in and out of bellows 82 by way of passageway 96 and valve aperture 98, and thereby controlling the time rate of elastic deformation of the bellows, a movable valve element such as substantially planar valve plate 100 is provided. The valve plate includes therein an arcuate opening 102 which is variable in width from one extremity to the other. Plate 100 is so mounted for rotation that opening 102 is movable closely adjacent to and across valve aperture 98 for varying the effective area of aperture 98 through which a fluid or gaseous medium may pass. Opening 102 may be so dimensioned as to permit flow in cooperation with and through aperture 98 between a maximum rate determined by the full area of aperture 98 and a minimum rate determined by the limitations upon the area of aperture 98 imposed by the narrowest portion of arcuate opening 102. Other valve means known in the art may be employed in place of plate 100 although the particular construction shown herein is preferred for its simplicity, lightness and ease of operation. Additionally, it should be noted that other means for establishing time intervals may be employed in place of a pneumatic device, some examples being a gear retarding mechanism such as shown in U.S. Patent No. 2,800,802 issued July 30, 1957, to K. F. Rentschler, and a magnetic retarding means as shown in U.S. Patent No. 2,486,169 issued October 25, 1949, to M. Kaplowitz.

Although the regulating means may provide exposure control according to a manual setting, in the form of the invention shown, the regulating means provides exposure control responsively to the electrical signal output of a photocell (not shown), which output is a function of the intensity of light incident thereon. As a means for translating these electrical signals into mechanical displacements, there is provided an electrodynamic device such as galvanometer 106 having a rotatable coil 108 and an indicating means, such as needle 110, mounted upon the coil for rotation therewith. The galvanometer is preferably of the type, well known in the art, wherein coil 108 and needle 110 assume an angular equilibrium position responsively to the intensity of the electrical signals produced by the photocell. As shown in the drawing, galvanometer 106 is mounted upon backing plate 20 in a substantially fixed relation thereto; however, in order to compensate for variables such as different film speeds of photographic films employed in cameras used with the invention, or the variations in density of filters which may be placed across opening 22, galvanometer 106 may be mounted upon the backing plate for rotation with respect thereto. Needle 110 and coil 108 comprise means for moving cam element 80, the latter being mounted on needle 110 for movement therewith so that the aperture determined by the diaphragm leaves responsively to the position and configuration of cam element 80 is a function of the ambient illumination represented by the angular position of the galvanometer coil. The surface of cam element 80 which is in engagement with pin 74 may be shaped to control the position of extending portion 72 and therefore the aperture-defining relation of notches 58 and 60 with opening 22. The aperture control attained through shaping of cam element 80 provides a predetermined relationship which is, for instance, such that the area of opening 62 bears a log-linear relation to the intensity of ambient illumination determined by the photocell.

Needle 110 and coil 108 also comprise means for moving valve plate 100 in rotation across valve aperture 98, plate 100 being mounted on needle 110 for movement therewith and, of course, for movement in fixed relation to cam element 80. It may therefore be seen that the rate of elastic deformation of the bellows is a function of the ambient illumination and bears a predetermined relation to the effective exposure aperture.

Inasmuch as coil 108 and associated needle 110 are preferably mounted for easy rotation and are therefore sensitive to vibration or other physical forces external to the invention which would disturb the equilibrium position thereof, it is desirable to provide means for releasably retaining the needle in a stationary position at least during exposure operation of the invention. Additionally, as cam element 80 is adapted to engage pin 74 to establish an effective exposure aperture in accordance with the equilibrium position of coil 108, it is preferred that needle 110 be held in a substantially stationary position at least during exposure through the aperture. Further, retaining or clamping the needle in a stationary position allows one to operate the mechanism so as to preset both the exposure time interval and effective exposure aperture prior to exposure operation of the mechanism. As shown particularly in Fig. 8, there is provided means for releasably retaining valve plate 100 in a substantially stationary position, which means may take the form of flat, resilient, elongated clamping member 112 one extremity of which is mounted, for instance, upon valve block 94 and extends therefrom such that a portion thereof is substantially parallel with the plane of movement of valve plate 100 and closely adjacent thereto, valve plate 100 being movable between member 112 and block 94. Clamping member 112 includes thereon a raised cam portion 114 which extends from the plane of the clamping member on the opposite side of the latter from the valve plate. The clamping member also includes, adjacent its unanchored extremity, opening 116 which is aligned with valve aperture 98 such that arcuate opening 102 in the valve plate is adapted to move freely between opening 116 and the valve aperture. Means are provided for moving clamping member 112 in and out of engagement with valve plate 100 and, in the form shown, comprises lever arm 118 mounted upon post 120 for rotation therewith. Lever arm 118 is rotatable in and out of sliding engagement with cam portion 114 such that upon engagement of the lever arm with the cam portion, the clamping member is cammed into engagement with the valve plate, thereby locking the valve plate between the extremity of the clamping member and the valve block. Post 120 is mounted on backing plate 20 and extends therethrough, being freely rotatable with respect to plate 20.

There is also provided means for releasably retaining cam element 80, which means comprises lever 122. Lever 122 is preferably mounted on post 120 so that, as post 120 rotates, lever 122 is brought into engagement with a portion of cam element 80, thereby arresting the latter by clamping it against the external periphery of galvanometer 106. Lever 122 is preferably mounted on post 120 by overrunning clutch means so that post 120 may continue its rotation even after lever 122 is in stationary engagement with the cam element. The arrangement of parts provides that the engagement of lever arm 118 with cam portion 114 and the clamping of cam element 80 occur at substantially the same time.

Figure 6:
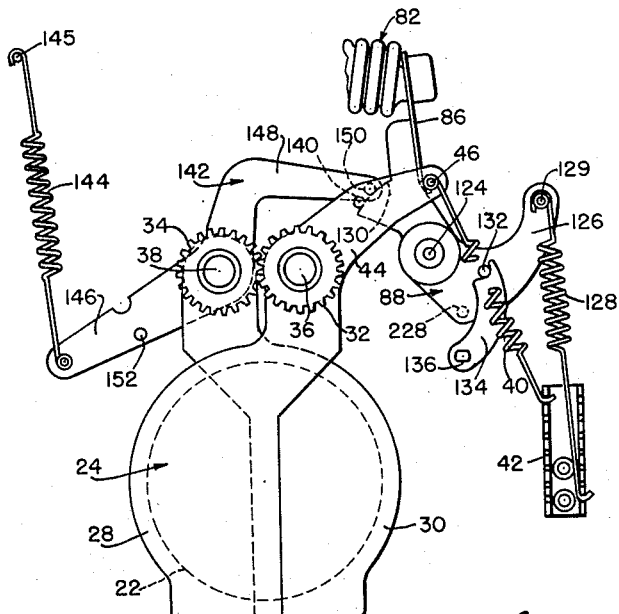
Fig. 6 is a schematic view, partly in fragment, of the shutter means, the impact member and timing means of the embodiment of Figure 1 showing the shutter blades in closed position.
Figure 7:
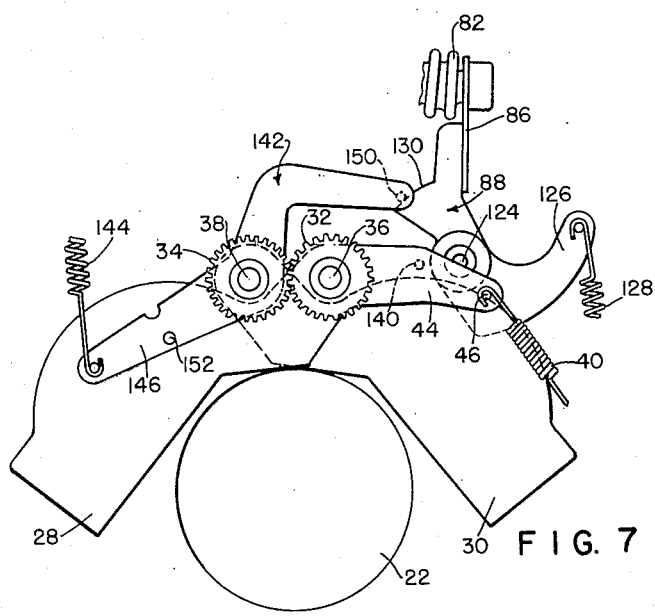
Fig. 7 is a schematic view of the elements of Fig. 6 showing the shutter blades in an open position.

The time-regulating means also includes timing means such as element 88 which is mounted, as shown particularly in Fig. 6, on backing plate 20 for rotation with respect thereto about suitable mounting means 124. Timing element 88 is provided with an arm 86 extending radially from mounting means 124 and being connected adjacent its radial extremity to movable extremity 84 of the bellows. Timing element 88 is also provided with a second arm 126 extending substantially radially from mounting means 124 and at an angle to arm 86. As a means for rotating the timing element there is provided a resilient means such as elongated spring 128 which is anchored at one end adjacent the radial extremity of arm 126 as at 129 and at its other end upon anchoring device 42. Spring 128 is disposed for biasing the timing element for rotation against the retarding effect of the bellows during, in the form shown, the bellows deformation in expansion. Intermediate bearing means 124 and the point of coupling of arm 86 and the bellows, arm 86 is provided with an extending cam surface 130. In the embodiment shown, surface 130 is shaped in a simple curve having a constant radius of curvature, the center of curvature being at bearing means 124. Timing element 88 is rotatable under the bias of spring 128 from a first position, wherein spring 128 is stressed to provide maximum tension and bellows 82 are in a collapsed position wherein the interior air space is at a predetermined minimum, to a second position wherein the bellows has been expanded to its fullest extent and permits of no further rotation of the timing element. The speed of movement of the timing element from its first to its second position is variable in accordance with the flow of air into the bellows as determined by the position of valve plate 100.

As a means for releasably retaining the timing element in its first position, the timing element is provided with an engageable portion or pin 132 mounted on second arm 126 intermediate bearing means 124 and the radial extremity of the second arm. The means for releasably retaining the timing element in its first position also includes a latching element 134 mounted upon post 136 for rotation therewith in and out of engagement with pin 132. Post 136 in turn is mounted upon backing plate 20 and extends therethrough, being rotatable freely with respect to the backing plate.

Lever arm 44 of shutter blade 28 is provided intermediate post 46 and gear 32 with a cam follower portion or stud 140 which extends substantially perpendicularly to blade 28. Stud 140 is located on arm 44 so that when timing element 88 is in its first position and the shutter blades are in their fully closed positions, stud 140 is in slidable engagement with surface 130 of the timing element. It will be seen that stud 140 and surface 130 therefore comprise means for releasably retaining the shutter blades in their closed position.

Figure 5:
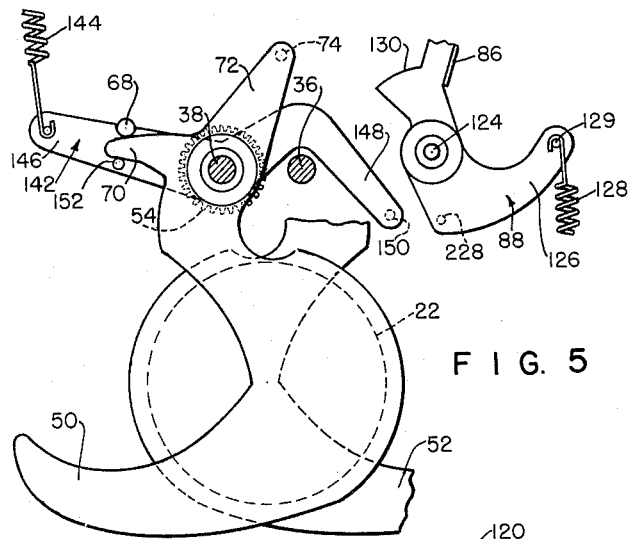
Fig. 5 is a schematic view of the diaphragm means of Fig. 4 and an impact member in operative position closing the leaves.

As a means for moving the diaphragm leaves from an aperture-defining position into fully covering position, the invention includes closure means, comprising impulse member 142, shown particularly in Figs. 5 and 6. Impulse member 142 preferably is in the form of an elongated element mounted intermediate its extremities upon post 38 for rotation independently of the post and of the other elements mounted on the post, the rotation being in a plane substantially parallel to the planes of movement of the shutter blades and diaphragm leaves. As a means for rotating the impulse member about post 38, there is provided a resilient element such as elongated spring 144 anchored at one end upon backing plate 20 as at 145, the other end of the spring being anchored adjacent one extremity 146 of the impulse member. Impulse member 142 is also provided adjacent the other extremity 148 with a cam follower portion or stud 150 which extends approximately perpendicularly thereof. Stud 150 is so disposed as to be in releasable engagement with surface 130 of the timing element when the latter is in its first position. When stud 150 and surface 130 are thus engaged, spring 144 is in a stressed state wherein it exerts a predetermined maximum bias for rotating impulse member 142. Stud 150 and surface 130 are so dimensioned that upon a predetermined angular rotation of the timing element from its first position, stud 150 is released or falls off of surface 130, impulse member 142 then being free to rotate rapidly under the bias of spring 144. Similarly, stud 140 and surface 130 are so dimensioned that upon a predetermined angular rotation of timing element 88, stud 140 is released and shutter blades 28 and 30 are free to rotate rapidly to their fully open position under the bias imposed by spring 40. In the preferred embodiment, the arrangement of studs 140 and 150 and surface 130 are such that upon rotation of the timing element from its first position the studs fall off in a sequence whereby first the shutter blades are free to open and then the impulse member is free to rotate.

Impulse member 142 is provided intermediate post 38 and extremity 146 with an engagement portion or pin 152 which extends substantially perpendicularly there- from and into the path of rotation of first extending portion 70 of diaphragm leaf 52. Impulse member 142 is so disposed that when stud 150 is releasably engaged by surface 130, pin 152 lies outside of the angular path of movement of first extending portion 70, being engageable with the first extending portion only following release of stud 150 from surface 130.

The invention also includes means for actuating the clamping members, shutter means and diaphragm means. In the form shown in Fig. 9, the actuating means comprises a linkage system, indicated generally by the reference numeral 154, disposed on the opposite surface 65 of backing plate 20 from the shutter and diaphragm means. Linkage system 154 includes an element such as bell crank 156 which is mounted intermediate its extremities upon the backing plate for rotation with respect thereto about suitable bearing means 158. The bell crank is mounted with one extremity 159 extending beyond the periphery of the backing plate so as to be manually engageable by an operator of the mechanism for rotating the bell crank about bearing means 158. Linkage system 154 also includes elongated lever 160, one extremity of which is attached to the end of post 120 which extends through to this side of the backing plate, lever arm 160 and post 120 being fixed for rotation together. Linkage system 154 also includes an elongated member such as link 162. One extremity of link 162 is pivotally mounted as at 164 adjacent the end of lever arm 160 furthest removed from post 120. The other extremity of link 162 is also pivotally mounted as at 166 upon the end of bell crank 156 furthest from extremity 159. Link 162 is provided intermediate its extremities with an extending portion or nose 168.

Upon manipulation by an operator of extremity 159, the entire linkage system is movable between a first or rest position and a second or displaced position. When the linkage system is in rest position, lever arm 118 and lever 122, both attached to post 120 for rotation therewith, are respectively out of engagement with cam portion 114 and cam element 80. As a means for biasing linkage system 154 into rest position, there is provided resilient means such as elongated spring 170 which is mounted at its ends respectively upon backing plate 20 and upon intermediate portion 172 of link 162.

The actuating means further includes an elongated member 176 which is mounted for rotation upon surface 65 of the backing plate by pivot 178 adjacent one extremity of element 176. The other extremity of element 176 includes an anchoring portion 180 to which the other extremity of spring 67 is attached. Means, such as spring 182, are also provided for resiliently biasing element 176 for rotation in a predetermined direction about pivot 178, spring 182 being an elongated spring mounted at its extremities respectively upon backing plate 20 and anchoring portion 180 of element 176. Both spring 67 and spring 182 are so disposed that they do not exert their biases in opposition to one another. Stop means such as pin 184 mounted upon the backing plate in the path of rotation of element 176 are provided for limiting the rotation of element 176 in said predetermined direction by engagement therewith. When element 176, because of the bias imposed by spring 182, is in engagement with pin 184 and lever arm 66 is in a rest position wherein the associated diaphragm leaves 50 and 52 are in fully covering position with respect to opening 22, the biasing effect of spring 67 upon lever 66 is minimal or preferably nonexistent. Spring 182 is substantially stronger than spring 67; consequently, the stiffness of unstressed spring 67 combined with the bias of spring 182 which maintains element 176 in its rest position, comprises means for releasably retaining the diaphragm leaves in fully covering position. Element 176 is provided intermediate its extremities with an upstanding portion or stud 185 which is so dimensioned as to extend into the path of movement of nose 168 of link 162 during movement of the linkage system from its rest position.

The actuating means also includes means, such as element 186, for moving post 136 and therefore for moving element 134 in and out of engagement with pin 132. Element 186 is in the form of a bell crank having two arms 188 and 190 disposed at an angle to one another, element 186 being mounted adjacent the junction of arms 188 and 190 and upon post 136 for rotation therewith. Means are provided in the form of an elongated spring 192, for biasing element 186 for rotation so that latching element 134 is therefore biased into engagement with pin 132. Spring 192 is attached at one extremity to backing plate 20 and at the other extremity to a portion of arm 188. Arm 190 is provided thereon with an upstanding portion such as pin 194 which extends into the path of rotation of element 176.

The parts of the invention thus far described operate in the following manner:

Electrical signals are produced as by a photoelectric device in accordance with the intensity of the radiation intended to be passed through the exposure aperture of the invention to effect an exposure. In response to these signals, coil 108 of galvanometer 106 assumes a position of equilibrium, needle 110 being moved correspondingly with the coil. Valve plate 100 moves with the needle so that opening 102 is rotated across valve aperture 98 to provide an effective area for aperture 98 which also corresponds to the position of the galvanometer taken in accordance with the radiation intensity. Because of its mounting upon needle 110, cam element 80 is also movable to a position corresponding to whatever equilibrium position is taken by coil 108.

The operator, to actuate the mechanism, grasps extremity 159 and, by exerting pressure thereagainst, rotates bell crank 156 in a counter-clockwise direction as shown in Fig. 9 about bearing means 158. Because of the linked connection, the initial rotation of the bell crank moves elongated member 160 and causes post 120 to rotate also. The rotation of post 120 is accompanied by the rotation of lever arm 118 into engagement with cam portion 114, and by the rotation of lever 122 into engagement with a portion of cam element 80, thereby releasably locking needle 110 and coil 108 in a substantially stationary position which is determined by the signals received by the galvanometer approximately at the instant the operator actuates the mechanism.

Further rotation of bell crank 156 by the operator moves link 162 to an intermediate position at which nose 168 engages stud 185; thus as the bell crank rotates further, it forces element 176 to rotate about pivot 178 away from its position adjacent pin 84 and against the bias of spring 182. This rotation of element 176 stresses spring 67, thereby providing a force which tends to rotate lever 66.

Diaphragm leaves 50 and 52, being coupled for rotation in opposite directions under the bias of spring 67, tend to move from their fully covering position with respect to opening 22. This movement is arrested at a position determined by the engagement of pin 74 with cam element 80, the magnitude of the effective exposure aperture defined by notches 58 and 60 being a function of the position of cam element 80 as shown in Fig. 4. Thus, the effective exposure aperture or stop of the invention is automatically predetermined in accordance with the electrical signals received by the galvanometer.

When element 186 is in a position wherein latching element 134 is in engagement with pin 132, rotation of element 176 through a predetermined angle from its rest position against pin 184 brings element 176 into engagement with pin 194. Continued rotation of element 176 against pin 194 creates a couple about post 136, causing element 186 to rotate against the bias of spring 192. This rotation of element 186 rotating post 136 also rotates latching element 134, releasing the latter from engagement with pin 132.

The release of latching element 134 from pin 132 permits timing element 88 to rotate under the bias of spring 128 from the first position of the timing element. The rotation of timing element 88 tends to expand bellows 82 from its collapsed position thereby causing an attenuation of the air in the bellows, thus creating a retarding force acting against the rotating bias of spring 128. The retarding force exerted by the bellows is variable in accordance with the rate of flow of air into the bellows, which rate is a function of the effective aperture provided by the combination of opening 102 and aperture 98 in accordance with the equilibrium position of the galvanometer coil. Consequently, the speed of rotation of timing element 88 is controlled in accordance with the electrical signals received by the galvanometer. As timing element 88 rotates from its first position, surface 130 moves relative to studs 140 and 150 and after a predetermined rotation releases stud 140 and after an additional rotation releases stud 150.

It will be seen that, because the interior space of bellows 82 is reduced to a predetermined minimum and not eliminated when the bellows is in a collapsed position, for an initial angular rotation of timing element 88 there is no retarding effect upon the timing element until the air is sufficiently attenuated. This permits the timing element to accelerate rapidly during the initial moment following release, regardless of the position of valve plate 100. Consequently, the time interval between release of the timing element and the drop-off of stud 140 is minimized.

With the release of stud 140, shutter blades 28 and 30 rotate rapidly and oppositely to one another from their closed position to their open position under the impetus provided by spring 40, thereby initiating exposure through the effective exposure provided by the cooperation of the diaphragm leaves and opening 22. The speed of rotation of the blades is dependent upon the force provided by spring 40. By minimizing the inertia of the blade and providing a strong spring 40, the blade speed can be readily made so high that the aperture may be uncovered in less than $5 \times 10^{-4}$ seconds.

Upon the drop-off of stud 150, impulse member 142 is rotated rapidly under the bias of spring 144 until pin 152 forceably engages first extending portion 70, lifting pin 74 from cam element 80 and driving diaphragm leaves 50 and 52 into closed position (as shown in Fig. 5), thereby abruptly terminating the exposure. The speed with which the diaphragm leaves are driven into closed position depends upon the inertia of member 142 which is preferably high, the inertia of the leaves which is preferably low, and the strength of spring 144; closing speeds may be obtained easily such that the aperture is covered within $5 \times 10^{-4}$ seconds by proper choice of values for these elements. The time interval of the exposure is thus determined by the speed of rotation of timing element 88 between the drop-off of studs 140 and 150, and consequently is a function of the electrical signals received by the galvanometer responsively to determination of the level of ambient illumination by a photocell.

Following rotation of element 186, release by the operator of extremity 159 and bell crank 156 allows the linkage system to return to its rest position under the bias of spring 170 and permits the return movement of all of the other elements under the biases imposed by the various springs or as reset by means described hereinafter.

Means are provided for resetting portions of the mechanism and for stressing various springs. In the form shown in Fig. 9, the means comprises a cocking lever 200, which is shaped as an elongated element having one extremity 202 knurled for manual engagement and the other extremity comprising first gear segment 204. Lever 200 is attached adjacent gear segment 204 to one end of first axle 206 for rotation therewith, extremity 202 extending outwardly beyond the periphery of backing plate 20 so as to be readily grasped by an operator of the device. The resetting means also includes second gear segment 208 mounted upon one end of second axle 210 for rotation therewith. Both axles are mounted adjacent one another so that the two gear segments are in meshing engagement, and both axles extend through backing plate 20, being freely rotatable with respect thereto. Means, such as spring 212, are provided for biasing lever 200 for rotation about axle 206.

Figure 11:
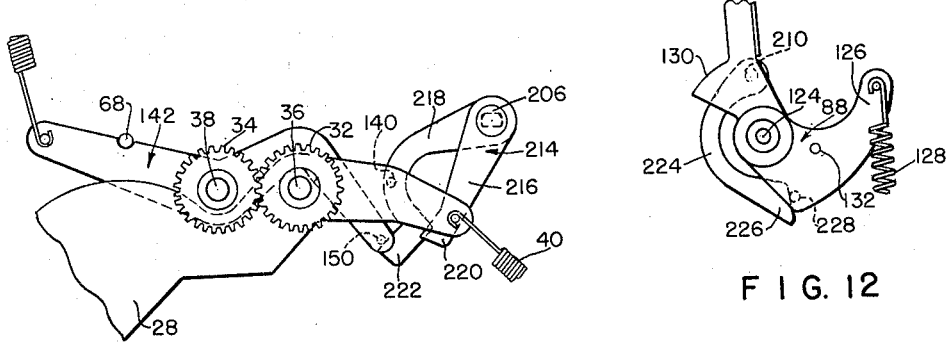
Fig. 11 is a schematic view of some elements of resetting means of the embodiment of Figure 1.
Figure 12:
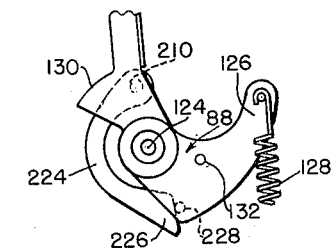
Fig. 12 is a schematic view of other elements of resetting means of the embodiment of Figure 1.

As shown in Fig. 11, attached to the other end of first axle 206 for rotation therewith is first resetting element 214 which includes two approximately radially extending arms 216 and 218, disposed at an angle to one another, the arms being rotatable in parallel but separate planes with rotation of axle 206. Element 214 is so formed and located that portions of the respective arcuate paths of movement of radial end portion 220 of of arm 216 and radial end portion 222 of arm 218 intersect and are approximately coincident with respective predetermined portions of the paths of movement of studs 140 and 150. Also provided as shown in Fig. 12 is second resetting element 224 which comprises an elongated member mounted adjacent one extremity upon the other end of second axle 210 for rotation therewith. Element 224 is so constructed and disposed that a predetermined portion of the arcuate path of movement of its other extremity 226 is substantially coincident with a predetermined portion of the path of movement of pin 228. Pin 228 is attached to and extends outwardly from second arm 126 of timing means 88 intermediate bearing means 124 and the radial extremity of arm 126, preferably extending from a surface of the arm opposite pin 132.

In order to reset the mechanism, an operator need only grasp extremity 202 of cocking lever 200 and force the cocking lever into rotation against the bias of spring 212. This rotates axle 206 and because of the meshing engagement of gear segments 204 and 208, counter-rotates axle 210. The rotation of axle 206 moves first resetting element 214, causing radial end portion 222 to engage stud 150 when impulse member 142 is so disposed that pin 152 is in engagement with first extending portion 70 of diaphragm leaf 52. Continued rotation of the first resetting element rotates the impulse member against the bias of spring 144 and also brings radial end portion 220 of arm 216 into engagement with stud 140 when the shutter blades are in their fully open position. Continuation of rotation of first resetting element 214 then moves the shutter blades toward one another as now both studs 140 and 150 are moved back toward the position wherein they are in engagement with surface 130 of timing means 88. The counter-rotation, meanwhile, of axle 210, rotates second resetting element 224 until radial extremity 226 engages pin 228 and moves to set element 88 against the bias of spring 128, thereby stressing spring 128 and collapsing bellows 84. Continuation of the rotation of second resetting element 224 moves surface 130 back toward the position wherein it is in engagement with studs 140 and 150. It is therefore apparent that resetting is effected by the continued rotation by the operator of lever 200 against the bias of spring 214 until surface 130 engages the studs, springs 128, 40 and 144 are stressed, bellows 82 is collapsed and the mechanism is ready for another exposure cycle. Release of cocking lever 200 then allows it to rotate under the bias of spring 214 back to its rest position along with the associated resetting elements.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A shutter mechanism comprising, in combination, diaphragm means movable between a first position, wherein said diaphragm means defines an exposure aperture which allows of the passage of radiation therethrough, and a second position wherein said diaphragm means occludes the passage of said radiation; shutter means mounted for movement from a covering position, wherein said shutter means occludes passage of radiation relative to said exposure aperture, to an uncovering position relative to said aperture for initiating exposure therethrough; and means for so moving said diaphragm means into said second position as to terminate said exposure while said shutter means is in said uncovering position.

2. A shutter mechanism comprising, in combination, diaphragm means movable between a first position wherein said diaphragm means defines a variable exposure aperture which allows of the passage of radiation therethrough and a second position wherein said diaphragm means occludes the passage of said radiation, shutter means mounted for movement from a covering to an uncovering position relative to said aperture, and means for sequentially moving first said shutter means to said uncovering position for initiating exposure through said aperture and then for moving said diaphragm means into said second position for terminating said exposure.

3. A shutter mechanism as defined in claim 2 including means for controlling the time interval between movement of said shutter means to said uncovering position and movement of said diaphragm means to said second position.

4. A shutter mechanism as defined in claim 2 wherein said means for sequentially moving includes means for moving said diaphragm means into said first position before said shutter means is moved to its uncovering position.

5. For use with a photoelectric means which produces electrical signals responsively to ambient illumination, a shutter mechanism as defined in claim 3, wherein said means for controlling the time interval comprises means for responding to said signals for establishing said time interval as a function of said illumination.

6. A shutter mechanism comprising, in combination, support means including an exposure opening, movable diaphragm means mounted on said support means adjacent said opening and cooperating with said opening for defining a variable effective exposure aperture, shutter means mounted on said support means and being movable from a covering to an uncovering position relative to said aperture for initiating exposure through said aperture, and means for moving said diaphragm means into fully covering position relative to said opening for terminating said exposure.

7. A shutter mechanism as defined in claim 6 including timing means for controlling the time interval between movement of said shutter means for initiating exposure and movement of said diaphragm means for terminating exposure.

8. A shutter mechanism as defined in claim 7 wherein said means for moving said diaphragm means is coupled with said timing means.

9. For use with a photoelectric means which produces electrical signals responsively to ambient illumination, a shutter mechanism as defined in claim 7, including means for responding to said signals for controlling said time means so that said time interval is a function of said illumination.

10. A shutter mechanism comprising, in combination, means including an exposure opening, movable diaphragm means normally disposed in covering relation to said exposure opening, means for biasing said diaphragm means for movement from said covering position toward a position wherein said movable diaphragm means cooperates with said opening for defining a maximum effective exposure aperture, means for arresting said movement of said diaphragm means at a predetermined position for establishing a predetermined exposure aperture, shutter means movable after establishment of said predetermined exposure aperture from a covering to an uncovering position relative to said aperture to initiate exposure through said aperture, and closure means for moving said diaphragm means back into said covering position relative to said opening for terminating said exposure.

11. A shutter mechanism as defined in claim 10 including means so coupled with both said closure means and said shutter means as to control the time interval between initiation and termination of said exposure.

12. A shutter mechanism comprising, in combination, means including an exposure opening, diaphragm means normally mounted for movement between a fully covering position relative to said exposure opening to occlude the passage of actinic radiation therethrough and a plurality of displaced positions wherein said diaphragm means cooperates with said exposure opening for defining an effective exposure aperture having a magnitude which is a function of the displacement of said diaphragm means from said covering position, means for moving said diaphragm means from said covering position to any of said displaced positions, shutter means normally mounted in fully covering position relative to said aperture to occlude the passage of actinic radiation therethrough and being movable from said covering position to an uncovering position relative to said aperture for initiating exposure therethrough, means for moving said shutter means from said covering to said uncovering position, closure means for moving said diaphragm means from displaced position to fully covering position, timing means coupled with said shutter means for releasably retaining said shutter means in said covering position and coupled with said closure means for releasably retaining the latter from moving said diaphragm means, said timing means being movable for sequentially releasing said shutter means for exposure-initiating movement and said closure means for exposure-terminating movement.

13. A shutter mechanism as defined in claim 12 including movable means engageable with said diaphragm means during movement of the latter from covering position for arresting said movement of said diaphragm means at a predetermined displaced position, and control means for controlling the movement of said movable means and the speed of movement of said timing means in predetermined relation to one another.

14. A shutter mechanism as defined in claim 13 including first means for releasably retaining said diaphragm means in said covering position, latch means for releasably retaining said timing means in its first position, and actuating means couplable with said first means and said latch means for releasing said diaphragm means and said timing means in sequence.

15. For use with a photoelectric means which produces electrical signals responsively to ambient illumination, a shutter mechanism as defined in claim 13, wherein said control means comprises means for responding to said signals and for establishing both the effective exposure aperture defined by said diaphragm means and the time interval between initiation and termination of exposure as determined by the speed of movement of said timing means as functions of said ambient illumination.

16. For use with a photoelectric means which produces electrical signals responsively to ambient illumination, a shutter mechanism as defined in claim 13, wherein said control means comprises an electrodynamic device having a portion thereof displaceable in accordance with said electrical signals, and a motion-retarding means having a retarding effect which is a function of the displacement of said portion, said motion-retarding means being coupled with said timing means for controlling the speed of movement thereof, and said portion being coupled with said movable means for controlling the movement of the latter.

17. A shutter mechanism comprising, in combination, means including an exposure opening, movable diaphragm means mounted adjacent said opening and being movable between a fully covering position with respect to said opening and a plurality of displaced positions wherein said diaphragm means cooperates with said opening for defining a variable effective exposure aperture, shutter means mounted adjacent said opening and being movable from a covering to an uncovering position relative to said aperture, closure means mounted for movement from a first position to a second position during which movement said closure means cooperates with said diaphragm means for moving the latter into fully covering position relative to said opening, and timing means for controlling a sequence of movements wherein first said shutter means is moved to uncovering position for initiating exposure through said effective exposure aperture and then said closure means is moved for moving said diaphragm means into covering position for terminating said exposure.

18. A shutter mechanism as defined in claim 17 wherein said timing means comprises a member mounted for movement between a rest and a displaced position, said member being, when in said rest position, in engagement with said shutter means and said closure means for releasably retaining said shutter means in said covering position and said closure means in said first position, said member, during movement to said displaced position, sequentially releasing first said shutter means for movement to said uncovering position and then releasing said closure means for movement, the time interval between release of said shutter means and of said closure means being a function of the speed of movement of said member.

19. A shutter mechanism comprising, in combination, support means including an exposure opening, a plurality of diaphragm elements normally mounted on said support means in a closed position wherein said elements cooperate for fully covering said exposure opening and being movable between said closed position and a plurality of open positions wherein said elements cooperate with one another and with said exposure opening for defining a plurality of effective exposure apertures, a plurality of shutter blades normally mounted on said support means in covering position with respect to said exposure opening and being movable from said covering position to an uncovering position wherein said blades are displaced from one another for permitting passage of actinic radiation through said exposure apertures, means for moving said shutter blades from said covering to said uncovering position, a closure member mounted on said support means for movement from a first position to a second position and being so engageable with said diaphragm elements as to move the latter into closed position during said movement of said closure member, and a timing element mounted on said support means for movement from a rest to a displaced position, said timing element being coupled in said rest position with said shutter blades for releasably retaining said blades in their covering position and being coupled with said closure member for releasably retaining the latter in its first position, said timing element being so shaped that during movement thereof to said displaced position said timing element sequentially releases first said shutter blades for movement to their uncovering position, thereby initiating exposure, and then releases said closure member for movement, thereby moving said diaphragm elements into closed position to terminate exposure.

20. A shutter mechanism as defined in claim 19 including a movable cam member mounted in the path of movement of a portion of said diaphragm elements and being engageable therewith during movement of the latter from covering position for arresting the movement of said diaphragm elements at a predetermined open position, the magnitude of the effective exposure aperture defined by the diaphragm elements and exposure opening at said open position being a function of the position and shape of said cam member, and control means for controlling the position of said cam member and the movement of said timing element from rest to displaced position in predetermined relation to one another.

21. A shutter mechanism as defined in claim 20 wherein said control element comprises an electrodynamic device having a portion thereof displaceable in accordance with electrical signals, and a motion-retarding member having a retarding effect which is a function of the displacement of said portion, said motion-retarding member being coupled with said timing element for controlling the speed of movement of the latter, and said cam member being mounted on said portion for movement therewith.

References Cited in the file of this patent

UNITED STATES PATENTS

| | | |
|---|---|---|
| 1,867,109 | Seifert | July 12, 1932 |
| 2,504,312 | Fairbank | Apr. 18, 1950 |
| 2,509,385 | Ziaylek | May 30, 1950 |
| 2,537,885 | Fox | Jan. 9, 1951 |
| 2,621,570 | Kesel | Dec. 16, 1952 |